(12) United States Patent
Otsuki

(10) Patent No.: US 9,599,539 B2
(45) Date of Patent: Mar. 21, 2017

(54) ACTUATOR FOR IGNITION OPERATION

(71) Applicant: MEIDENSHA CORPORATION, Tokyo (JP)

(72) Inventor: Kazuhisa Otsuki, Gunma (JP)

(73) Assignee: MEIDENSHA CORPORATION, Tokyo (JP)

( * ) Notice: Subject to any disclaimer, the term of this patent is extended or adjusted under 35 U.S.C. 154(b) by 36 days.

(21) Appl. No.: 14/396,921

(22) PCT Filed: Mar. 21, 2013

(86) PCT No.: PCT/JP2013/058096
§ 371 (c)(1),
(2) Date: Oct. 24, 2014

(87) PCT Pub. No.: WO2013/161461
PCT Pub. Date: Oct. 31, 2013

(65) Prior Publication Data
US 2015/0053026 A1    Feb. 26, 2015

(30) Foreign Application Priority Data
Apr. 27, 2012 (JP) ................................ 2012-102064

(51) Int. Cl.
F16H 53/02 (2006.01)
G01M 17/007 (2006.01)
G05G 1/02 (2006.01)

(52) U.S. Cl.
CPC ........ *G01M 17/0074* (2013.01); *F16H 53/02* (2013.01); *G05G 1/02* (2013.01); *Y10T 74/139* (2015.01)

(58) Field of Classification Search
CPC ........ F16H 53/02; G05G 1/02; G01M 17/007; G01M 17/0074
(Continued)

(56) References Cited

U.S. PATENT DOCUMENTS 1,556,889 A * 10/1925 Wright ................ B25D 11/068
74/55
1,588,832 A * 6/1926 Young ................. B25D 11/102
74/56
(Continued)

FOREIGN PATENT DOCUMENTS

JP          3-68041 U      7/1991
JP          05-157666 A    6/1993
(Continued)

*Primary Examiner* — William C Joyce
(74) *Attorney, Agent, or Firm* — Foley & Lardner LLP

(57) ABSTRACT

An ignition operation actuator including a drive section, a flexible shaft rotationally driven by the drive section, and an operation section on a tip end portion of the flexible shaft, the operation section including a press button that presses a push-type ignition, a motion conversion mechanism, and a holder to which the press button and a motion conversion mechanism are mounted, the motion conversion mechanism including a cam that is rotated about a rotation shaft so as to press a cam engagement portion disposed on a back face side of the push-type ignition, wherein the tip end portion of the flexible shaft is detachably connected to an adapter disposed on the holder, and rotation of the flexible shaft is transmitted to the rotation shaft of the cam via a rotation transmission mechanism.

17 Claims, 6 Drawing Sheets

(58) Field of Classification Search
USPC .......................................... 74/53, 54, 55, 56
See application file for complete search history.

(56) References Cited

U.S. PATENT DOCUMENTS

| | | | | |
|---|---|---|---|---|
| 1,832,732 A * | 11/1931 | Peacock | ................... | B21J 15/10 |
| | | | | 74/55 |
| 2,029,326 A * | 2/1936 | Lembke | ............... | B25D 11/104 |
| | | | | 74/56 |
| 2,087,018 A * | 7/1937 | Carter | ................... | B23D 49/162 |
| | | | | 74/57 |
| 2,113,084 A * | 4/1938 | Hewitt | ................... | B25D 11/12 |
| | | | | 74/55 |
| 2,121,831 A * | 6/1938 | Simmons | ............... | A45D 29/14 |
| | | | | 74/57 |
| 2,317,158 A * | 4/1943 | Westover | ............... | B25D 11/10 |
| | | | | 74/55 |
| 2,525,922 A * | 10/1950 | Mandl | ................... | B25D 11/08 |
| | | | | 74/57 |
| 2,884,842 A * | 5/1959 | Schmitz | ................. | E01C 19/35 |
| | | | | 74/55 |
| 3,152,942 A * | 10/1964 | Horton | ................... | B29C 73/08 |
| | | | | 156/408 |
| 3,374,685 A * | 3/1968 | Eheim | ................... | F16H 25/125 |
| | | | | 74/56 |
| 3,438,271 A * | 4/1969 | Cain | ...................... | F16H 25/14 |
| | | | | 74/10.6 |
| 3,449,967 A * | 6/1969 | Dancsik | ................. | B23D 79/00 |
| | | | | 74/56 |

FOREIGN PATENT DOCUMENTS

| | | |
|---|---|---|
| JP | 2004-087140 A | 8/2004 |
| JP | 2009-162715 A | 7/2009 |
| JP | 2009-233844 A | 10/2009 |

* cited by examiner

ACTUATOR FOR IGNITION OPERATION

TECHNICAL FIELD

The present invention relates to an actuator for ignition operation which is used in such a case that a running test of a vehicle is conducted by a chassis dynamometer and performs ignition operation.

BACKGROUND ART

As known, the actuator for ignition operation includes a rotary ignition operation actuator that rotationally operates a rotary ignition (for example, Patent Literature 1) and a press-type ignition operation actuator that pressingly operates a push-type ignition (for example, Patent Literature 2).

FIG. 12 and FIG. 13 show one example of a rotary ignition operation actuator 101. As shown in FIG. 12, the rotary ignition operation actuator 101 includes a drive section 102 constituted of a motor, a gear box, a rotational transmission coupling, etc., a flexible shaft 103 that is rotationally driven by the drive section 102, an operation section 104 mounted to a tip end portion of the flexible shaft 103, the operation section 104 rotationally operating an ignition key 105, and a chucking member 107 through which the drive section 102 is attached to a steering wheel 106.

As shown in FIG. 13, the operation section 104 includes a U-shaped key hold member 108 having a pair of pieces 108a, 108b opposed to each other. An end portion of the ignition key 105 is inserted into a space between the pair of pieces 108a, 108b, and is urged against the side of the other piece 108b by a set screw 109 screwed through the one piece 108a of the pair of pieces 108a, 108b. Thus, the ignition key 105 is sandwiched between the pieces 108a, 108b. Then, the ignition key 105 is rotated by the drive section 102 and the flexible shaft 103, so that an ignition operation is performed.

Further, the press-type ignition operation actuator, not shown, is of such a type as to pressingly operate a press-type (push-type) ignition with an operation button. As the press-type ignition operation actuator, there are known a type that pressingly operates the push-type ignition by converting rotation of a motor as a drive source to linear movement of the operation button through a motion conversion mechanism, and a type to pressingly operate the operation button using an air cylinder.

CITATION LIST

Patent Literature

Patent Literature 1: Japanese Patent Application Unexamined Publication No. 5-157666
Patent Literature 2: Japanese Patent Application Unexamined Publication No. 2004-87140

SUMMARY OF THE INVENTION

Technical Problem

However, the above-described conventional ignition operation actuator has posed the following problems.
(1) The ignition operation actuator using an air cylinder as a drive source necessitates an air compressor to supply air, piping, an electromagnetic valve, an electric circuit to operate the electromagnetic valve, and the like, thereby causing increase in cost.
(2) The rotary ignition operation actuator using a motor as a drive source uses a rack and pinion gear, a ball screw, a ball nut, etc. in the motion conversion mechanism for converting rotation of the motor. Due to the presence of the rack and pinion gear, the ball screw, the ball nut, etc., a length and a size of an operation section of the rotary ignition operation actuator is increased. Therefore, there is a possibility that depending on a vehicle, the rotary ignition operation actuator cannot be mounted to the vehicle (depending on a vehicle, an ignition is mounted behind a steering wheel, and in such a case, the actuator is excessively long to thereby cause inevitable interference with the steering wheel).
(3) Since the above-described conventional rotary ignition operation actuator 101 is mounted to the steering wheel 106 by the chucking member 107, there is a fear that misalignment between a center point of the operation section 104 and a center point of an ignition button is caused due to a play of the steering wheel 106.
(4) The above-described conventional rotary ignition operation actuator is configured as an actuator dedicated to the ignition key which rotationally operates the ignition key exclusively. Further, the above-described conventional press-type ignition operation actuator is configured as an actuator dedicated to the press-type ignition which operates the push-type ignition exclusively. Therefore, it is not possible to operate the push-type ignition key by using the rotary ignition operation actuator, and to the contrary, it is not possible to press the rotary ignition key by using the push-type ignition operation actuator. For the above reasons, in order to manipulate the rotary ignition (ignition key) and the push-type ignition, it is necessary to prepare the two kinds of actuators, that is, the rotary ignition operation actuator and the press-type ignition operation actuator.
(5) In hybrid vehicles and electric vehicles which are increased in recent years, use of the push-type ignition key different from the conventional rotary ignition and a push-type start button in the electric vehicles is increased. If an actuator is such a type as used for only one of the push-type ignition key and the push-type start button, the entire actuator must be replaced every time at which the vehicles to be tested are changed. This results in deterioration in test efficiency.

The present invention has been made in order to provide a press-type ignition operation actuator that uses a motor as a drive source and converts rotation of the motor into linear motion of a press button by a motion conversion mechanism so as to pressingly operate a push-type ignition, in which a cam is used in the motion conversion mechanism to thereby simplify the operation section for the ignition. In addition, the present invention has been made in order to use the above-described rotary ignition operation actuator as the press-type ignition operation actuator by sharing the drive section of the rotary ignition operation actuator and the flexible shaft to be rotationally driven by the drive section and replacing the operation section of the rotary ignition operation actuator with the operation section of the press-type ignition operation actuator.

Solution to Problem

According to a first aspect of the present invention, there is provided an ignition operation actuator including a drive section including a motor and a rotation transmission coupling, a flexible shaft that is rotationally driven by the drive section, and an operation section mounted to a tip end portion of the flexible shaft so as to pressingly operate a push-type ignition of a vehicle, the operation section including a press button that presses the push-type ignition, a motion conversion mechanism configured to convert rotation of the flexible shaft into a linear motion of the press button, and a holder to which the press button and the motion conversion mechanism are mounted, the motion conversion mechanism including a cam that is rotated about a rotation shaft so as to press a cam engagement portion disposed on a back face side of the push-type ignition, wherein the tip end portion of the flexible shaft is detachably connected to an adapter disposed on the holder, and rotation of the flexible shaft is transmitted to the rotation shaft of the cam via a rotation transmission mechanism.

According to a second aspect of the present invention, there is provided the ignition operation actuator as described in the first aspect, wherein the cam is provided with a cam follower that is brought into contact with the cam engagement portion and presses the cam engagement portion.

According to a third aspect of the present invention, there is provided the ignition operation actuator as described in the second aspect, wherein the cam follower is constituted of a first cam follower disposed on an end portion of one side of the cam with respect to a rotation shaft of the cam, and a second cam follower disposed on an end portion of the other side of the cam with respect to the rotation shaft of the cam.

According to a fourth aspect of the present invention, there is provided the ignition operation actuator as described in the second aspect, further including a spring that pushes back the press button when the cam engagement portion is released from pressing by the cam follower.

According to a fifth aspect of the present invention, there is provided the ignition operation actuator as described in the fourth aspect, wherein the cam engagement portion includes a first cam engagement surface that is opposed to the first cam follower and pressed by the first cam follower, and a second cam engagement surface that is opposed to the second cam follower and pressed by the second cam follower, the first cam engagement surface and the second cam engagement surface each being formed into an inclined surface inclined in such a direction that as a distance on the inclined surface which extends from a central portion of a boundary between the first cam engagement surface and the second cam engagement surface toward a side of the cam engagement portion increases, the inclined surface is gradually spaced apart from the corresponding cam followers.

According to a sixth aspect of the present invention, there is provided the ignition operation actuator as described in any one of the first to fifth aspects, wherein the operation section is mounted to a fixed frame fixed to a seat of a vehicle through an arm.

According to a seventh aspect of the present invention, there is provided the ignition operation actuator as described in any one of the first to fifth aspects, wherein the operation section is mounted to a fixed frame fixed to a seat of a vehicle through an arm and a fixture.

According to an eighth aspect of the present invention, there is provided the ignition operation actuator as described in any one of the first to fifth aspects, wherein the operation section is mounted to an interior surface of a vehicle by means of a suction cup.

Advantageous Effects of Invention (1) In the ignition operation actuator as described in the first aspect, a cam is used in the motion conversion mechanism configured to convert rotation of the motor into a linear motion of the press button. Therefore, as compared with the conventional ignition operation actuator in which the conventional motion conversion mechanism uses a rack and pinion gear, a ball screw, a ball nut, etc., the configuration of the operation section can be simplified to thereby reduce a size and a weight of the operation section.

Particularly, the tip end portion of the flexible shaft is detachably connected to an adapter disposed on the holder, and rotation of the flexible shaft is transmitted to the rotation shaft of the cam via a rotation transmission mechanism. With this configuration, the ignition operation actuator can be used as a rotary ignition operation actuator by detaching the press-type operation section from the tip end portion of the flexible shaft and attaching the rotary operation section 104 as shown in FIG. 12 and FIG. 13 to the tip end portion of the flexible shaft instead.

(2) In the ignition operation actuator as described in the second aspect, the cam is provided with a cam follower, and the cam engagement portion disposed on the back face side of the press button is pressed by the cam follower. With this configuration, the cam follower is rotated to slide on the cam engagement portion and press the cam engagement portion.

(3) In the ignition operation actuator as described in the third aspect, the cam follower includes a first cam follower disposed on an end portion of one side of the cam with respect to the rotation shaft of the cam, and second cam follower disposed on an end portion of the other side of the cam with respect to the rotation shaft of the cam. With this configuration, one of the cam followers can press the cam engagement portion by rotating the cam in one direction, and the other of cam followers can press the cam engagement portion by rotating the cam in the other direction (rotating the cam in a reverse direction).

(4) In the ignition operation actuator as described in the fourth aspect, when the cam engagement portion is released from the state being pressed by the cam follower, the press button is urged by a spring so as to return to an ignition press release position in which the push-type ignition is released from the pressed state.

(5) In the ignition operation actuator as described in the fifth aspect, the cam engagement portion includes a first cam engagement surface opposed to the first cam follower so as to be pressed by the first cam follower, and a second cam engagement surface opposed to the second cam follower so as to be pressed by the second cam follower, the first cam engagement surface and the second cam engagement surface each being formed into an inclined surface inclined in such a direction that as a distance on the inclined surface which extends from a central portion of a boundary between the first cam engagement surface and the second cam engagement surface toward a side of the cam engagement portion increases, the inclined surface is gradually spaced apart from the corresponding cam follower. With this configuration, a return movement of the press button which is caused by the spring can be smoothly performed.

(6) In the ignition operation actuator as described in the sixth aspect, the operation section is mounted to a fixed frame fixed to a seat of a vehicle through an arm. With this configuration, even if there is a play in a steering wheel, displacement of a center point of pressing of the press button can be suppressed.

(7) In the ignition operation actuator as described in the seventh aspect, the operation section can be more certainly held in place by an arm of a fixed frame fixed to a seat of a vehicle and a fixture.

(8) In the ignition operation actuator as described in the eighth aspect, the operation section can be sucked and fixed to an interior surface of a vehicle by means of a suction cup even if a free guide arm or the like is not used.

DESCRIPTION OF EMBODIMENTS

Figure 1:
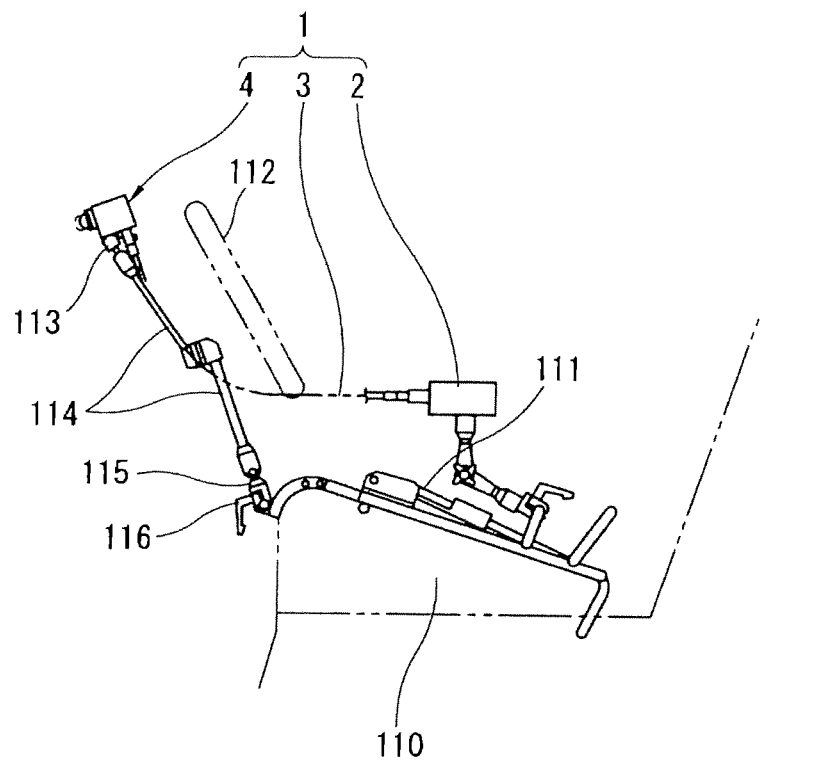
FIG. 1 is an explanatory diagram showing a used state of an ignition operation actuator according to an embodiment of the present invention.

In the following, an embodiment of the present invention will be explained by referring to drawings. FIG. 1 is an explanatory diagram showing a used state of an ignition operation actuator 1 according to the embodiment of the present invention. The ignition operation actuator 1 includes a drive section 2 including a motor, a gear box and a rotational transmission coupling (not shown), a flexible shaft 3 that is rotationally driven by the drive section 2, and an operation section 4 mounted to a tip end portion of the flexible shaft 3 and configured to pressingly operate a press-type ignition 117 (see FIG. 2) of a vehicle.

The drive section 2 and the operation section 4 are mounted to a fixed frame 111 for fixing a drive robot (not shown) to a seat 110 of the vehicle, and suppress misalignment with a center point of the ignition 117 to which the pressing force is to be applied, the misalignment being caused due to a play of a steering wheel 112.

The operation section 4 is mounted to a tip end portion of a free guide arm 114 through a universal joint 113. A base end portion of the free guide arm 114 is mounted to a clamp lever 116 provided on the fixed frame 111, by means of a clamp 115.

Figure 2:
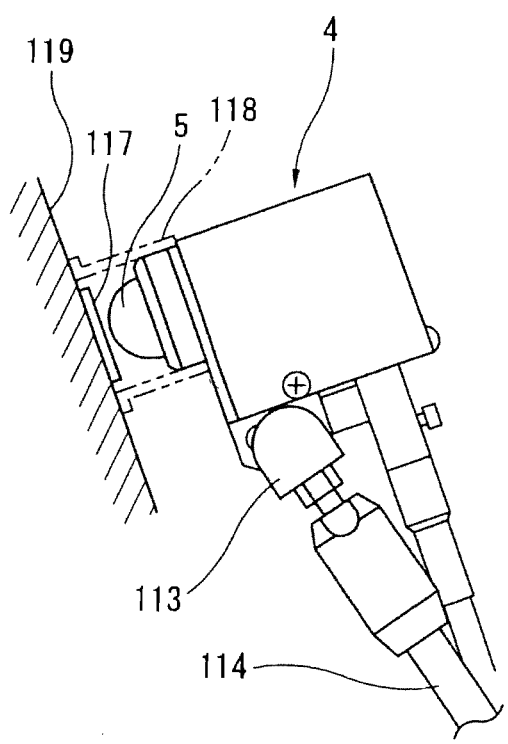
FIG. 2 is an explanatory diagram showing a mounted state of an operation section of the ignition operation actuator which is mounted to an interior of a vehicle.

As shown in FIG. 2, the operation section 4 is mounted via the free guide arm 114 in such a state that an operation button (press button) 5 as explained later is opposed to the press-type ignition 117. When it is expected that a center of the press button 5 is brought into misalignment with a center of the ignition 117 due to vibration of the seat, a fixture 118 shown in two-dot chain line is fitted to concave portions and convex portions formed around the ignition 117, or by any other suitable method, so that the ignition operation actuator operation section 4 can surely press the center of the ignition 117.

Figure 3:
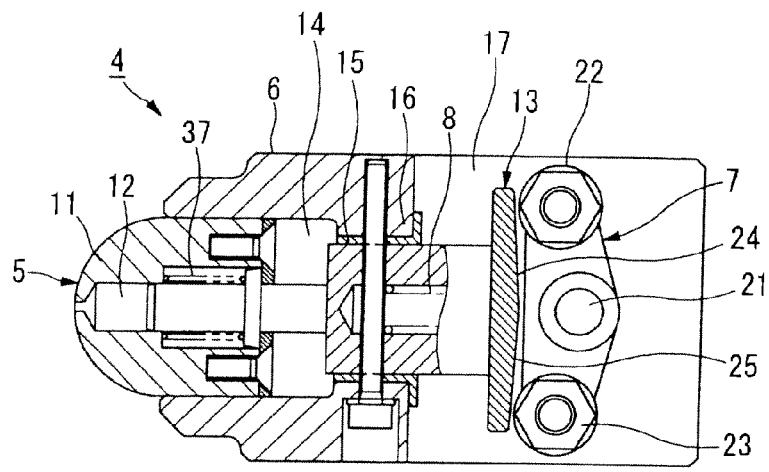
FIG. 3 is an explanatory diagram showing a non-projected state of an operation button of the operation section.
Figure 4:
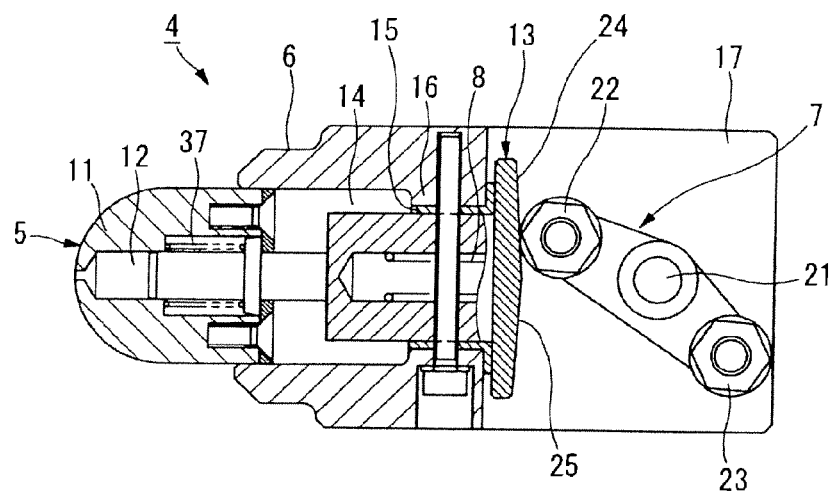
FIG. 4 is an explanatory diagram showing a projected state of the operation button.

FIG. 3 and FIG. 4 are sectional views of the operation section 4. FIG. 3 shows the operation button 5 retreated and moved to a position in which the pressing force applied to the press-type ignition 117 is released. FIG. 4 shows the operation button 5 projected and moved to a position in which the press-type ignition 117 is pressed.

The operation section 4 includes the operation button 5, a holder 6 to which the operation button 5 is slidably mounted, a cam 7 that presses the operation button 5 to project to a position shown in FIG. 4, and a spring 8 that returns the operation button 5 to the position shown in FIG. 3 when the pressing force applied by the cam 7 is released. The spring 8 is most preferably a coil spring, but may be any other spring member.

The operation button 5 includes a button body 11 that presses the press-type ignition 117, a rod 12 having one end portion to which the button body 11 is mounted, and a cam engagement portion 13 mounted to the other end portion of the rod 12, the cam engagement portion 13 being pressed by the cam 7.

The holder 6 has a button body accommodation portion 14 on one end side thereof which accommodates the button body 11, a rod support portion 16 in a middle thereof which slidably supports the rod 12 through a thrust bearing 15, and a cam accommodation portion 17 on the other end side thereof which accommodates the cam 7.

The cam 7 is formed into a generally isosceles triangle shape, and has a central portion mounted to a rotation shaft 21 and both side portions to which first and second cam followers 22, 23 are mounted. Either one of the cam followers 22, 23 presses the cam engagement portion 13.

The cam engagement portion 13 includes a first cam engagement surface 24 located to be opposed to the first cam follower 22 and a second cam engagement surface 25 located to be opposed to the second cam follower 23. The first cam engagement surface 24 is pressed by the first cam follower 22. The second cam engagement surface 25 is pressed by the second cam follower 23.

Figure 5:
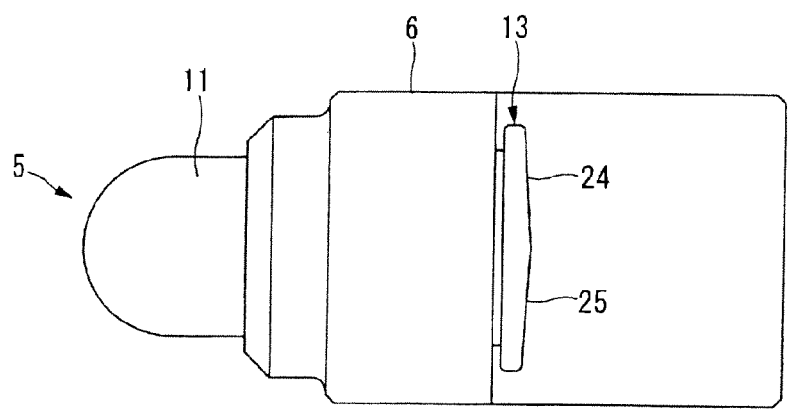
FIG. 5 is an explanatory diagram showing a cam engagement section of the operation button.

As shown in FIG. 5, each of the first cam engagement surface 24 and the second cam engagement surface 25 is formed into an inclined surface inclined in such a direction that as a distance on the inclined surface which extends from a boundary between the first cam engagement surface 24 and the second cam engagement surface 25 toward a side of the cam engagement portion 13 increases, the inclined surface is gradually spaced apart from the corresponding cam follower 22, 23.

Figure 6:
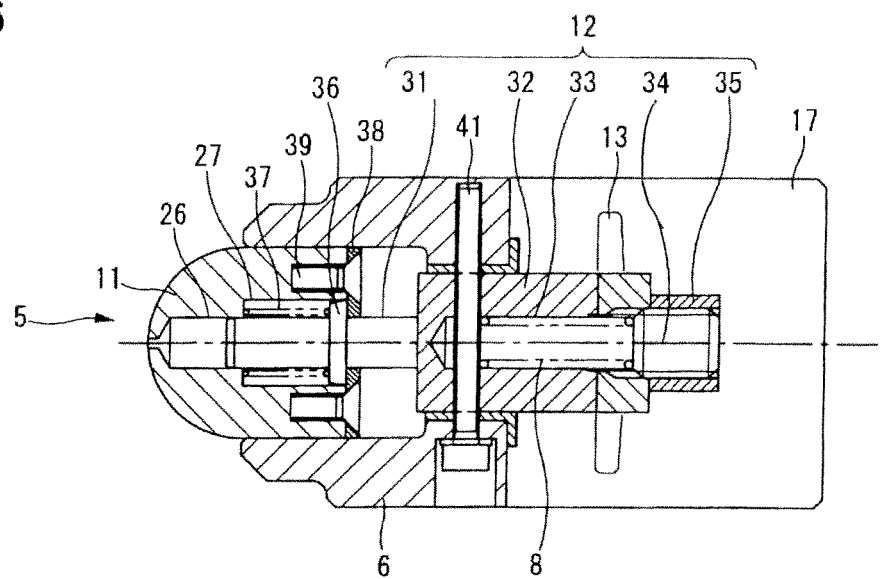
FIG. 6 is an explanatory diagram showing a mounted state of a cam of the operation section and an expanded state of a return coil spring of the operation section.
Figure 7:
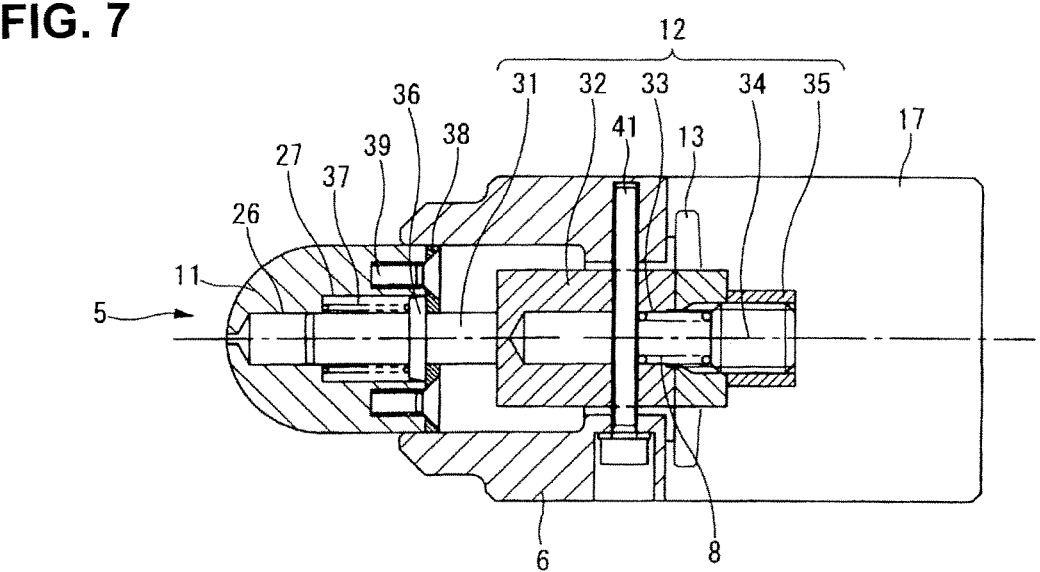
FIG. 7 is an explanatory diagram showing a mounted state of the cam and a compressed state of the return coil spring.

Next, a configuration of the rod 12, a method of mounting the rod 12 to the button body 11, and a method of mounting the cam engagement portion 13 to the rod 12 are explained by referring to FIG. 6 and FIG. 7.

The button body 11 includes a rod mount hole 26 into which a tip end of the rod 12 is inserted and fixed thereto, and a spring receiving hole 27 communicated with one end portion of the rod mount hole 26. The spring receiving hole 27 has a diameter larger than a diameter of the rod mount hole 26.

The rod 12 includes a first shaft portion 31, a second shaft portion 32 having a diameter larger than a diameter of the first shaft portion 31, a bolt 34 inserted into a bolt receiving hole 33 formed in the second shaft portion 32, and a nut 35 screwed onto an outer circumference of a head of the bolt 34 so as to sandwich the can engagement portion 13 between the nut 35 and the second shaft portion 32.

A tip end of the first shaft portion 31 is attached to the rod mount hole 26. Further, a central portion of the first shaft portion 31 is formed with a flange 36. Disposed between the flange 36 and a bottom surface of the coil spring receiving hole 27 is a spring 37 that is compressed for a relief motion of the button body 11 when an excessive load is exerted on the button body 11. Reference sign 38 denotes a ring-shaped member attached to a back side of the button body 11 by means of bolts 39. The ring-shaped member 38 serves as a stop against which the flange 36 is abutted.

Attached to the holder 6 is an operation button rotation inhibition pin 41 that extends through the thrust bearing 15 and the rod support portion 16. The operation button rotation inhibition pin 41 is inserted into a slit formed in the second shaft portion 32. The operation button rotation inhibition pin 41 inhibits rotation of the rod 12 and the button body 11, and allows the rod 12 and the button body 11 to linearly move. The spring 8 is interposed between the operation button rotation inhibition pin 41 and the head of the bolt 34.

Figure 8:
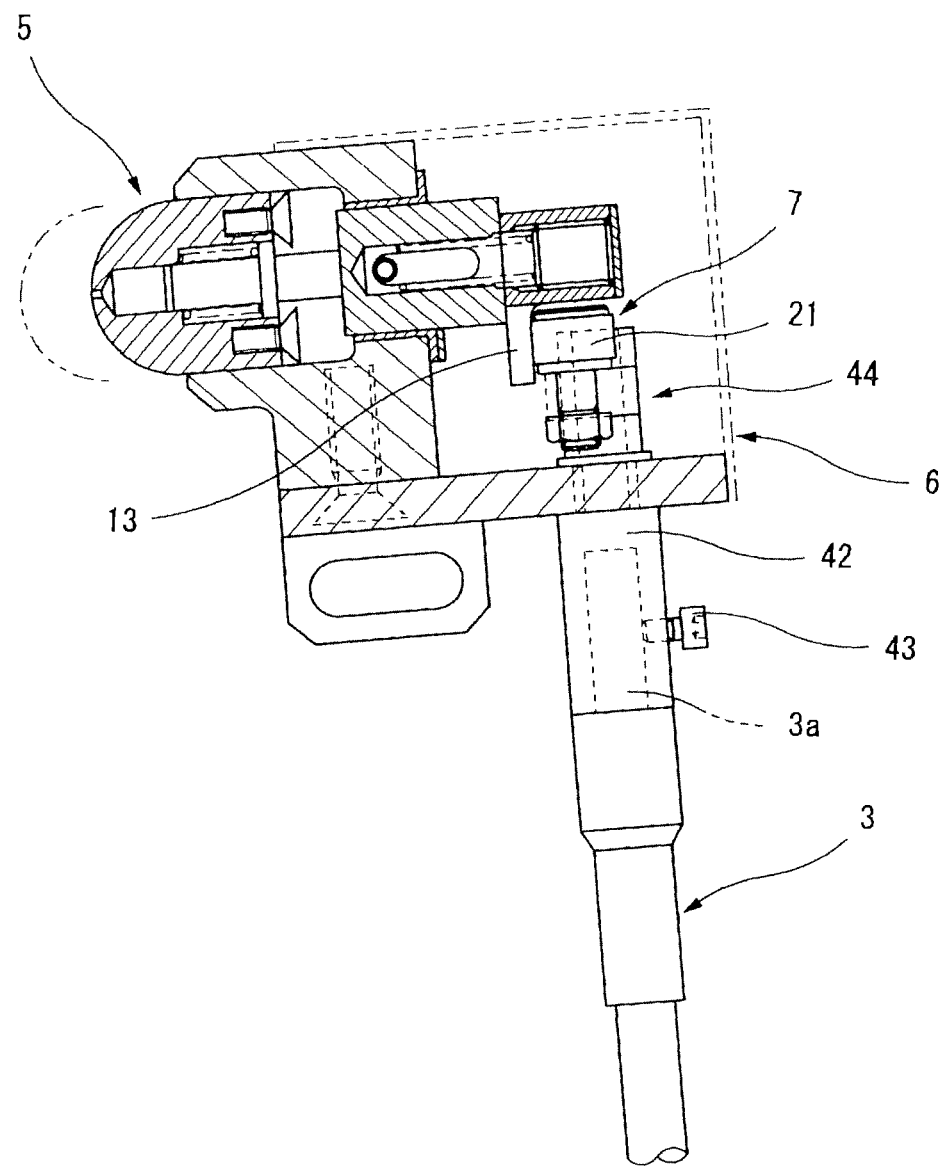
FIG. 8 is an explanatory diagram showing a coupling state of the operation section and a flexible shaft.

As shown in FIG. 8, a tip end 3a of the flexible shaft 3 is connected to an adapter 42 disposed on a lower surface of the holder 6 by means of a fixing bolt 43. Rotation of the flexible shaft 3 is transmitted to the rotation shaft 21 of the cam 7 through a rotation transmission mechanism 44.

Next, an operation of the ignition operation actuator 1 will be explained.

As shown in FIG. 3, in the state in which the cam engagement portion 13 is not pressed by the cam 7, the cam engagement portion 13 is pushed back by the spring 8 so that the press-type ignition 117 is in a state released from the pressing force applied thereto by the operation button 5. When the cam 7 is rotated from this state by a predetermined angle in a counterclockwise direction in FIG. 3 via the flexible shaft 3 by the drive section 2, the first cam engagement surface 24 of the cam engagement portion 13 is pressed by the first cam follower 22 so that the operation button 5 is projected to pressingly operate the press-type ignition 117 as shown in FIG. 4.

On the contrary, when the cam 7 is rotated by a predetermined angle in a clockwise direction in FIG. 3 via the flexible shaft 3 by the drive section 2, the second cam engagement surface 25 of the cam engagement portion 13 is pressed by the second cam follower 23 so that the operation button 5 is projected to pressingly operate the press-type ignition 117.

When releasing the press-type ignition 117 from the pressing force applied thereto by the operation button 5, the cam 7 is returned to the position shown in FIG. 3 such that the cam engagement portion 13 is released from the pressing force applied thereto. At this time, the cam engagement portion 13 is pushed back by the spring force of the spring 8, so that the press-type ignition 117 can be released from the pressing force applied thereto by the operation button 5.

Figure 9:
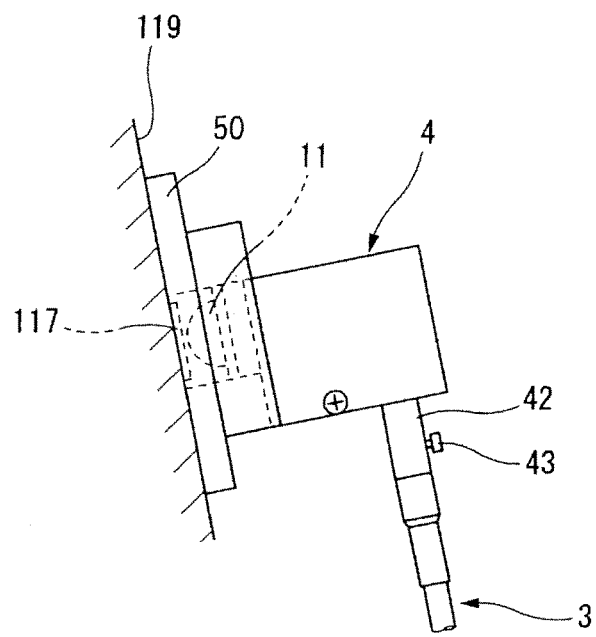
FIG. 9 is an explanatory diagram showing a case in which the operation section is fixed to an interior surface of a vehicle body by using a suction cup.

FIG. 9 shows an embodiment of a method of fixing the operation section 4 to an interior surface 119 of the vehicle without using the free guide arm 114. In the above-described previous embodiment, the operation section 4 is fixed using only the free guide arm 114, and the operation section 4 is surely fixed to the interior surface 119 of the vehicle by using the fixture 118. In the case of fixing the operation section 4 using the fixture 118, the operation section 4 is not firmly fixed to the interior surface 119 of the vehicle such as a dashboard, and therefore, the free guide arm 114 is necessary. On the other hand, as shown in FIG. 9, the operation section 4 is firmly sucked on the interior surface 119 of the vehicle by using a suction cup 50, so that the center of the operation button 5 can be aligned with the center of the ignition 117 to which the pressing force is to be applied, without using the free guide arm 114.

Figure 10:
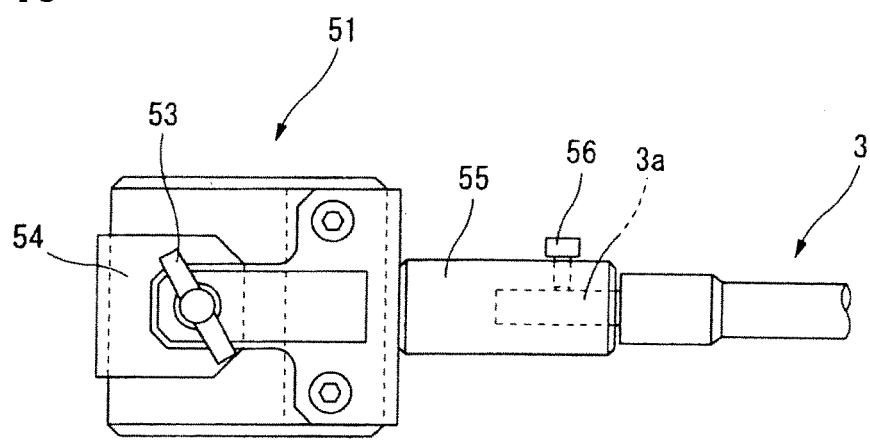
FIG. 10 is a front view showing a rotary operation section.
Figure 11:
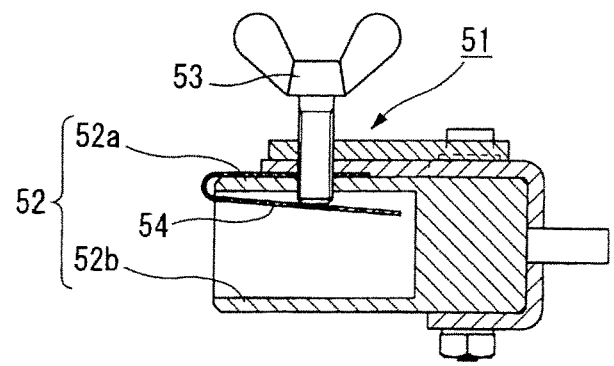
FIG. 11 is a side view showing the rotary operation section.
Figure 12:
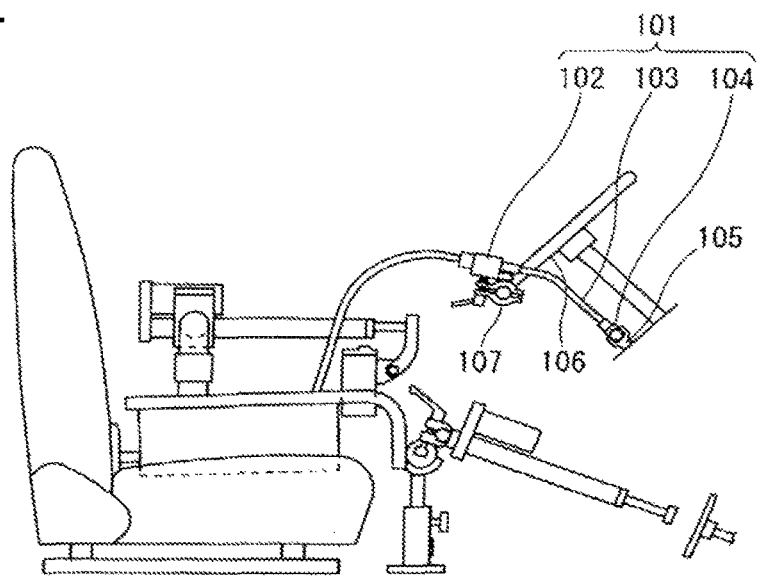
FIG. 12 is an explanatory diagram showing a conventional ignition operation actuator.
Figure 13:
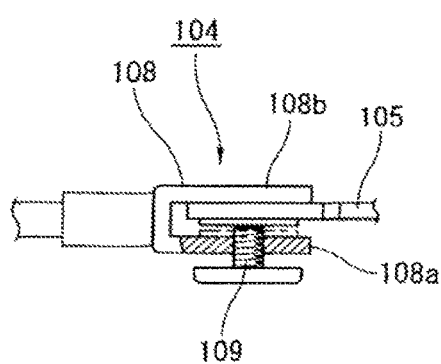
FIG. 13 is an explanatory diagram showing an example of a conventional rotary operation section.

FIG. 10 and FIG. 11 show a rotary operation section 51 that operates the above-described rotary ignition. The rotary operation section 51 includes a generally U-shaped key hold member 52 having a pair of pieces 52a, 52b opposed to each other. An end portion of an ignition key (not shown) is inserted into a space between the pair of pieces 52a, 52b. A wing screw 53 screwed into one piece 52a and a leaf spring 54 set to the one piece 52a cooperate to urge the ignition key against the side of the other piece 52b so that the ignition key is sandwiched between the pieces 52a, 52b and retained by the pieces 52a, 52b.

The key hold member 52 has an adapter 55 on one side surface thereof. The tip end 3a of the flexible shaft 3 is inserted into the adapter 55 and fixed by a fastening screw 56. Thus, the key hold member 52 is connected to the tip end 3a of the flexible shaft 3. Then, the rotary operation section 51 and the ignition key are rotated by the flexible shaft 3 to thereby perform on-off operation of the ignition.

Accordingly, in a case where the press-type operation section 4 and the rotary operation section 51 are prepared, it is possible to mount the rotary operation section 51 instead of the press-type operation section 4 to the tip end 3a of the flexible shaft 3, so that the ignition operation actuator can be also used for operating the ignition key for the rotary ignition.

REFERENCE SIGNS LIST

1 . . . ignition operation actuator
2 . . . drive section
3 . . . flexible shaft
4 . . . operation section
5 . . . operation button
6 . . . holder
7 . . . cam
8 . . . spring
13 . . . cam engagement portion
21 . . . rotation shaft of cam
22 . . . first cam follower
23 . . . second cam follower
24 . . . first cam engagement portion
25 . . . second cam engagement portion
42, 55 . . . adapter
44 . . . rotation transmission mechanism

The invention claimed is:
1. An ignition operation actuator comprising:
a drive section comprising a motor and a rotation transmission coupling;
a flexible shaft that is rotationally driven by the drive section; and
an operation section mounted to a tip end portion of the flexible shaft so as to pressingly operate a push start ignition of a vehicle, wherein
the operation section comprises a press button that presses the push start ignition, a motion conversion mechanism configured to convert rotation of the flexible shaft into a linear motion of the press button, and a holder to which the press button and the motion conversion mechanism are mounted,
the motion conversion mechanism comprises a cam that is rotated about a rotation shaft so as to press a cam engagement portion disposed on a back face side of the press button, an axial direction of the rotation shaft is perpendicular to a direction of the linear motion of the press button, the tip end portion of the flexible shaft is detachably connected to an adapter disposed on the holder, and rotation of the flexible shaft is transmitted to the rotation shaft of the cam via a rotation transmission mechanism, wherein the cam is provided with a cam follower that is brought into contact with the cam engagement portion and presses the cam engagement portion, and wherein the cam follower is constituted of a first cam follower disposed on an end portion of one side of the cam with respect to the rotation shaft of the cam, and a second cam follower disposed on an end portion of the other side of the cam with respect to the rotation shaft of the cam.

2. The ignition operation actuator as claimed in claim 1, wherein the cam engagement portion comprises a first cam engagement surface opposed to the first cam follower so as to be pressed by the first cam follower, and a second cam engagement surface opposed to the second cam follower so as to be pressed by the second cam follower, the first cam engagement surface and the second cam engagement surface each being formed into an inclined surface inclined in such a direction that as a distance on the inclined surface which extends from a central portion of a boundary between the first cam engagement surface and the second cam engagement surface toward a side of the cam engagement portion increases, the inclined surface is gradually spaced apart from the corresponding cam follower.

3. The ignition operation actuator as claimed in claim 2, wherein the operation section is mounted to a fixed frame fixed to a seat of a vehicle through an arm.

4. The ignition operation actuator as claimed in claim 2, wherein the operation section is mounted to a fixed frame fixed to a seat of a vehicle through an arm and a fixture.

5. The ignition operation actuator as claimed in claim 2, wherein the operation section is mounted to an interior surface of a vehicle via a suction cup.

6. The ignition operation actuator as claimed in claim 1, wherein the operation section is mounted to a fixed frame fixed to a seat of a vehicle through an arm.

7. The ignition operation actuator as claimed in claim 1, wherein the operation section is mounted to a fixed frame fixed to a seat of a vehicle through an arm and a fixture.

8. The ignition operation actuator as claimed in claim 1, wherein the operation section is mounted to an interior surface of a vehicle via a suction cup.

9. An ignition operation actuator comprising:
a drive section comprising a motor and a rotation transmission coupling;
a flexible shaft that is rotationally driven by the drive section;
an operation section mounted to a tip end portion of the flexible shaft so as to pressingly operate a push start ignition of a vehicle, wherein
the operation section comprises a press button that presses the push start ignition, a motion conversion mechanism configured to convert rotation of the flexible shaft into a linear motion of the press button, and a holder to which the press button and the motion conversion mechanism are mounted,
the motion conversion mechanism comprises a cam that is rotated about a rotation shaft so as to press a cam engagement portion disposed on a back face side of the press button,
an axial direction of the rotation shaft is perpendicular to a direction of the linear motion of the press button,
the tip end portion of the flexible shaft is detachably connected to an adapter disposed on the holder, and rotation of the flexible shaft is transmitted to the rotation shaft of the cam via a rotation transmission mechanism,
the cam is provided with a cam follower that is brought into contact with the cam engagement portion and presses the cam engagement portion;
a spring that urges the press button to return to an ignition press release position in which the push start ignition is released from a pressing force applied to the push start ignition by the press button, when the cam engagement portion is released from pressing by the cam follower; and
an operation button rotation inhibition pin provided in a slit in the press button, the operation button rotation inhibition pin being a transverse pin with respect to the press button.

10. The ignition operation actuator as claimed in claim 9, wherein the operation section is mounted to a fixed frame fixed to a seat of a vehicle through an arm.

11. The ignition operation actuator as claimed in claim 9, wherein the operation section is mounted to a fixed frame fixed to a seat of a vehicle through an arm and a fixture.

12. The ignition operation actuator as claimed in claim 9, wherein the operation section is mounted to an interior surface of a vehicle via a suction cup.

13. An ignition operation actuator comprising:
a drive section comprising a motor and a rotation transmission coupling;
a flexible shaft that is rotationally driven by the drive section;
an operation section mounted to a tip end portion of the flexible shaft so as to pressingly operate a push start ignition of a vehicle, wherein
the operation section comprises a press button that presses the push start ignition, a motion conversion mechanism configured to convert rotation of the flexible shaft into a linear motion of the press button, and a holder to which the press button and the motion conversion mechanism are mounted,
the motion conversion mechanism comprises a cam that is rotated about a rotation shaft so as to press a cam engagement portion disposed on a back face side of the press button,
an axial direction of the rotation shaft is perpendicular to a direction of the linear motion of the press button,
the tip end portion of the flexible shaft is detachably connected to an adapter disposed on the holder, and rotation of the flexible shaft is transmitted to the rotation shaft of the cam via a rotation transmission mechanism, and
the cam is formed into a generally isosceles triangle shape and has a central portion mounted to the rotation shaft.

14. The ignition operation actuator as claimed in claim 13, wherein the operation section is mounted to a fixed frame fixed to a seat of a vehicle through an arm.

15. The ignition operation actuator as claimed in claim 13, wherein the operation section is mounted to a fixed frame fixed to a seat of a vehicle through an arm and a fixture.

16. The ignition operation actuator as claimed in claim 13, wherein the operation section is mounted to an interior surface of a vehicle via a suction cup.

17. An ignition operation actuator comprising:
a drive section comprising a motor and a rotation transmission coupling;
a flexible shaft that is rotationally driven by the drive section; and
an operation section mounted to a tip end portion of the flexible shaft so as to pressingly operate a push start ignition of a vehicle, wherein
the operation section comprises a press button that presses the push start ignition, a motion conversion mechanism configured to convert rotation of the flexible shaft into a linear motion of the press button, and a holder to which the press button and the motion conversion mechanism are mounted,
the motion conversion mechanism comprises a cam that is rotated about a rotation shaft so as to press a cam engagement portion disposed on a back face side of the press button,
the tip end portion of the flexible shaft is detachably connected to an adapter disposed on the holder, and rotation of the flexible shaft is transmitted to the rotation shaft of the cam via a rotation transmission mechanism,
the cam is provided with a cam follower that is brought into contact with the cam engagement portion and presses the cam engagement portion,
the cam follower is constituted of a first cam follower disposed on an end portion of one side of the cam with respect to the rotation shaft of the cam, and a second cam follower disposed on an end portion of the other side of the cam with respect to the rotation shaft of the cam, and
the cam engagement portion comprises a first cam engagement surface opposed to the first cam follower so as to be pressed by the first cam follower, and a second cam engagement surface opposed to the second cam follower so as to be pressed by the second cam follower, the first cam engagement surface and the second cam engagement surface each being formed into an inclined surface inclined in such a direction that as a distance on the inclined surface which extends from a central portion of a boundary between the first cam engagement surface and the second cam engagement surface toward a side of the cam engagement portion increases, the inclined surface is gradually spaced apart from the corresponding cam follower.

* * * * *